(12) United States Patent
Jung et al.

(10) Patent No.: US 11,322,788 B2
(45) Date of Patent: May 3, 2022

(54) LAMINATE SHEET FOR BATTERY CASES HAVING THICKNESS DEVIATION AND POUCH-SHAPED BATTERY CASE MANUFACTURED USING THE SAME

(71) Applicant: LG Chem, Ltd., Seoul (KR)

(72) Inventors: Do Hwa Jung, Daejeon (KR); Ki Woong Kim, Daejeon (KR)

(73) Assignee: LG Energy Solution, Ltd.

( * ) Notice: Subject to any disclaimer, the term of this patent is extended or adjusted under 35 U.S.C. 154(b) by 76 days.

(21) Appl. No.: 16/761,013

(22) PCT Filed: Oct. 25, 2019

(86) PCT No.: PCT/KR2019/014172
§ 371 (c)(1),
(2) Date: May 1, 2020

(87) PCT Pub. No.: WO2020/116780
PCT Pub. Date: Jun. 11, 2020

(65) Prior Publication Data
US 2021/0151823 A1    May 20, 2021

(30) Foreign Application Priority Data
Dec. 7, 2018 (KR) .......................... 10-2018-0156837

(51) Int. Cl.
*H01M 50/105* (2021.01)
*H01M 50/126* (2021.01)
(Continued)

(52) U.S. Cl.
CPC ......... *H01M 50/105* (2021.01); *B32B 15/085* (2013.01); *B32B 15/20* (2013.01); *H01M 50/126* (2021.01); *B32B 2457/10* (2013.01)

(58) Field of Classification Search
CPC . H01M 50/105; H01M 50/126; B32B 15/085; B32B 15/20; B32B 457/10
See application file for complete search history.

(56) References Cited

U.S. PATENT DOCUMENTS

2009/0305128 A1*  12/2009  Yeo ...................... H01M 50/116
                                                         429/174
2011/0287308 A1    11/2011  Kim et al.
(Continued)

FOREIGN PATENT DOCUMENTS

JP    2009295582 A    12/2009
JP    2016143520 A    8/2016
(Continued)

OTHER PUBLICATIONS

KR20150130002 translation (Year: 2015).*
International Search Report for Application No. PCT/KR2019/014172, dated Jan. 30, 2020, pp. 1-3.

*Primary Examiner* — Jane J Rhee
(74) *Attorney, Agent, or Firm* — Lerner, David, Littenberg, Krumholz & Mentlik, LLP (57) ABSTRACT

Disclosed are a laminate sheet for battery cases with improved formability, the laminate sheet for battery cases including, as a preliminary recess portion configured to receive an electrode assembly, a preliminary bottom portion and a preliminary sidewall portion constituting the side surface of the preliminary recess portion, wherein a preliminary sealing portion is located at an outer edge extending from the preliminary sidewall portion, and the thickness of the preliminary sidewall portion is formed so as to be larger than the thickness of the preliminary bottom portion, a pouch-shaped battery case manufactured by forming the laminate sheet, and a battery pack including the pouch-shaped battery case.

13 Claims, 9 Drawing Sheets

(51) Int. Cl.
     *B32B 15/085*     (2006.01)
     *B32B 15/20*      (2006.01)

(56) References Cited

U.S. PATENT DOCUMENTS

| | | |
|---|---|---|
| 2011/0311862 A1 | 12/2011 | Ahn |
| 2017/0279093 A1 | 9/2017 | Park |

FOREIGN PATENT DOCUMENTS

| | | |
|---|---|---|
| KR | 20070112488 A | 11/2007 |
| KR | 20090092108 A | 8/2009 |
| KR | 20110128594 A | 11/2011 |
| KR | 20110139108 A | 12/2011 |
| KR | 20140104538 A | 8/2014 |
| KR | 20140131714 A | 11/2014 |
| KR | 20150089556 A | 8/2015 |
| KR | 20150130002 A | 11/2015 |
| KR | 20160120090 A | 10/2016 |
| KR | 101738542 B1 | 5/2017 |
| KR | 20170090577 A | 8/2017 |
| KR | 20180038765 A | 4/2018 |
| KR | 20180126553 A | 11/2018 |

\* cited by examiner

LAMINATE SHEET FOR BATTERY CASES HAVING THICKNESS DEVIATION AND POUCH-SHAPED BATTERY CASE MANUFACTURED USING THE SAME

CROSS-REFERENCE TO RELATED APPLICATIONS

The present application is a national phase entry under 35 U.S.C. § 371 of International Application No. PCT/KR2019/014172 filed Oct. 25, 2019, which claims priority from Korean Patent Application No. 10-2018-0156837 filed Dec. 7, 2018, all of which are incorporated herein by reference.

TECHNICAL FIELD

The present invention relates to a laminate sheet for battery cases having a thickness deviation and a pouch-shaped battery manufactured using the same, and more particularly to technology capable of solving a problem that occurs at the time of forming a recess portion configured to receive an electrode assembly in a pouch-shaped high-capacity battery.

BACKGROUND ART

The demand for secondary batteries as energy sources that are capable of being repeatedly charged and discharged for portable electronic products, such as mobile phones, tablet PCs, and cleaners has rapidly increased, and secondary batteries that are applicable to devices that require high capacity and high efficiency, such as electric vehicles and power storage apparatuses, have been developed and researched.

Among such secondary batteries is a lithium secondary battery, which has advantages, such as high energy density, high voltage, high output, and excellent lifespan characteristics, and has been widely used for these reasons.

Secondary batteries are classified into a pouch-shaped secondary battery, a cylindrical secondary battery, and a prismatic secondary battery based on the kind of a sheathing material. The pouch-shaped secondary battery has a structure in which an electrode assembly is mounted in a pouch-shaped case made of a laminate sheet including a metal layer, and has advantages in that the pouch-shaped secondary battery is easy to manufacture and cost of manufacturing the pouch-shaped secondary battery is low. In addition, it is possible to easily construct a large-capacity battery pack by connecting a plurality of pouch-shaped unit cells to each other in series and/or in parallel.

Meanwhile, as the size of the electrode assembly is increased in order to manufacture a high-capacity pouch-shaped secondary battery, a method of deeply forming a recess portion configured to receive the electrode assembly may be used. When considering the durability and thickness of the battery case, cracks may be generated due to stretching of the metal layer in the case in which the recess portion is formed to more than a predetermined depth. In addition, a bleaching phenomenon in which a polymer constituting a polymer layer of the battery case is discolored white due to deformation of the polymer may occur.

In order to solve such a problem, a method of increasing the entire thickness of the battery case or increasing the value of R at the time of forming the recess portion may be used. In the case in which the thickness of the battery case is increased, however, the thickness of a battery cell increases, which becomes an issue when the battery cell is received in a battery pack. In the case in which the value of R is increased, insertability is reduced when the electrode assembly is received in the battery case, whereby process efficiency is lowered.

In connection therewith, Patent Document 1 discloses a pouch forming apparatus that indirectly heats corners of an electrode assembly receiving portion through a high-frequency induction heater at the time of pressing the surface of a pouch film in order to form the electrode assembly receiving portion, thereby improving flexibility of the corners of the electrode assembly receiving portion.

That is, Patent Document 1 uses a method of heating the corners of the electrode assembly receiving portion at the time of forming the electrode assembly receiving portion, but does not suggest a method of deeply forming the electrode assembly receiving portion.

Patent Document 2 discloses a pouch film forming apparatus for secondary batteries including a structure in which a step is formed at the angular point of a punch, which is capable of preventing the occurrence of pin holes or cracks at the time of forming a pouch film, but does not suggest a method of deeply forming a concave recess of the pouch film.

Patent Document 3 discloses a method of manufacturing a battery case including a process of performing deep drawing in the state in which a film member for forming is attached to a laminate sheet, wherein it is possible to improve formability of a receiving portion of the laminate sheet.

Therefore, there is a high necessity for development of a pouch-shaped secondary battery configured to have a structure in which the occurrence of pin holes or cracks is prevented when a recess configured to receive an electrode assembly is formed deep in order to manufacture a high-capacity pouch-shaped battery cell and in which an increase in thickness of a battery case does not affect an increase in thickness of a battery cell.

Related Art Document

Patent Document 1: Korean Patent Application Publication No. 2015-0089556 (2015 Aug. 5)

Patent Document 2: Korean Patent Application Publication No. 2014-0131714 (2014 Nov. 14)

Patent Document 3: Korean Patent Application Publication No. 2018-0038765 (2018 Apr. 17)

DISCLOSURE

Technical Problem

The present invention has been made in view of the above problems, and it is an object of the present invention to provide a laminate sheet configured to have a structure in which damage to the laminate sheet is prevented when a recess configured to receive an electrode assembly is formed and in which an increase in thickness of a battery case does not affect an increase in thickness of a battery cell and a pouch-shaped battery case manufactured using the same.

Technical Solution

A laminate sheet for battery cases according to an embodiment of the present invention provided to accomplish the above object may include, has a preliminary recess portion configured to receive an electrode assembly, a preliminary bottom portion and a preliminary sidewall portion constituting the side surface of the preliminary recess portion, wherein a preliminary sealing portion may be located at an outer edge extending from the preliminary sidewall portion, and the thickness of the preliminary sidewall portion may be formed so as to be larger than the thickness of the preliminary bottom portion.

The laminate sheet may include an outer coating layer, a metal layer, and an inner sealant layer, and at least one of the outer coating layer or the metal layer of the preliminary sidewall portion may be formed so as to be thicker than a corresponding one of the outer coating layer or the metal layer of the preliminary bottom portion.

The thickness of the metal layer of the preliminary sidewall portion may be formed so as to be larger than the thickness of the metal layer of the preliminary bottom portion.

The thickness of the preliminary sidewall portion may have a thickness deviation within a range within which the thickness of the preliminary sidewall portion is larger than the thickness of the preliminary bottom portion.

The laminate sheet may be configured such that the preliminary recess portion configured to receive the electrode assembly and a preliminary cover portion are formed on both sides of a preliminary bending line, and wherein the preliminary cover portion may be formed in a planar shape, and with a thickness equal to the thickness of the preliminary bottom portion.

The laminate sheet may be configured to have a structure in which the preliminary recess portion configured to receive the electrode assembly is formed on both sides on the basis of the preliminary bending line in a symmetrical fashion, and the thickness of the preliminary sidewall portion may be formed so as to be larger than the thickness of the preliminary bottom portion.

The thickness of the preliminary sidewall portion and the thickness of the preliminary sealing portion may be formed so as to be larger than the thickness of the preliminary bottom portion.

The outer coating layer of the preliminary sidewall portion may be made of a different material than the outer coating layer of each of the preliminary bottom portion and the preliminary sealing portion.

The outer coating layer of the preliminary sidewall portion may be made of a material that exhibits higher elongation than the outer coating layer of each of the preliminary bottom portion and the preliminary sealing portion.

In addition, the present invention provides a pouch-shaped battery case manufactured by forming the laminate sheet for battery cases.

In the pouch-shaped battery case, the thickness of a sidewall portion constituting the side surface of a recess configured to receive an electrode assembly may be equal to or larger than the thickness of a bottom portion of the recess.

In addition, the present invention provides a pouch-shaped battery cell including the pouch-shaped battery case, and also provides a battery pack having pouch-shaped battery cells stacked therein, wherein a bottom portion of one of the battery cells may be disposed so as to face a cover portion or a bottom portion of an adjacent battery cell in tight contact therewith.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

A laminate sheet for battery cases according to the present invention includes an outer coating layer, a metal layer, and an inner sealant layer.

It is required for the outer coating layer not to be affected by external environmental change and not to be bleached since the outer coating layer is stretched during a process of forming a battery case, and therefore excellent tensile strength and weather resistance are necessary. For example, a polyester-based resin, such as polyethylene naphthalate (PEN), polyethylene terephthalate (PET), or polybutylene terephthalate (PBT), a polyolefin-based resin, such as polyethylene (PE) or polypropylene (PP), a polystyrene-based resin, such as polystyrene, a polyvinyl chloride-based resin, or a polyvinylidene chloride-based resin may be used as a polymer resin constituting the outer coating layer.

The metal layer may be made of aluminum (Al), an aluminum alloy, or stainless steel in order to exhibit a function of improving strength of the battery case in addition to a function of preventing introduction of foreign matter, such as gas and moisture, or leakage of an electrolytic solution.

A single material or a combination of two or more materials may be used as the metal layer. In the case in which the metal layer is made of a combination of two or more materials, the metal layer may be configured to have a multilayered structure, or may be configured such that different materials are partially applied.

Stainless steel is a material that exhibits higher strength than aluminum. In the case in which stainless steel is used as the metal layer, therefore, it is possible to improve formability of the battery case. Consequently, it is possible to prevent pin holes or cracks from being generated during formation of an electrode assembly receiving recess and to form the battery case such that the depth of an electrode assembly receiving portion is relatively large, compared to a battery case including an aluminum layer.

Also, in the case in which stainless steel is used as the metal layer of the battery case, it is possible to form a metal layer having a smaller thickness than aluminum. Consequently, the thickness of the battery case may be reduced, whereby it is possible to manufacture a secondary battery having an increased ratio of capacity to volume.

A polymer resin that exhibits thermal fusibility (thermal adhesiveness) and has low hygroscopicity to the electrolytic solution in order to inhibit permeation of the electrolytic solution may be used as the inner resin layer. For example, the inner resin layer may be made of cast polypropylene (CPP).

The laminate sheet includes, as a preliminary recess portion configured to receive the electrode assembly, a preliminary bottom portion and a preliminary sidewall portion constituting the side surface of the preliminary recess portion, and a preliminary sealing portion is located at an outer edge extending from the preliminary sidewall portion.

In a concrete example, the laminate sheet may be configured such that a preliminary recess portion configured to receive the electrode assembly and a preliminary cover portion are formed at both sides on the basis of a preliminary bending line, the preliminary cover portion is formed in a planar shape, and the preliminary cover portion has a thickness equal to the thickness of the preliminary bottom portion.

Figure 1:
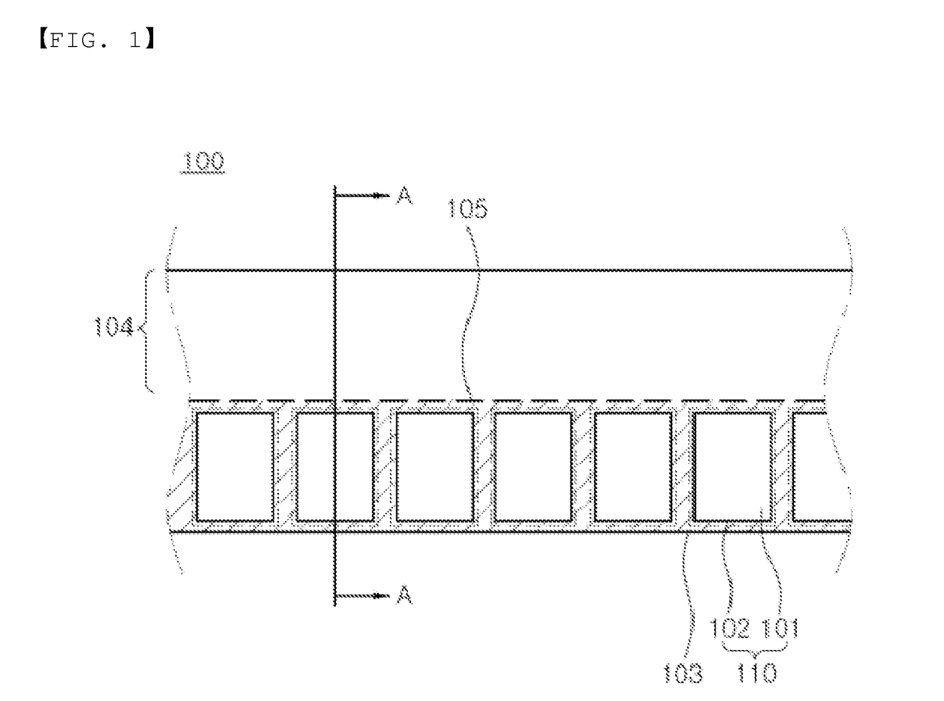
FIG. 1 is a plan view of a laminate sheet according to a first embodiment.
Figure 2:
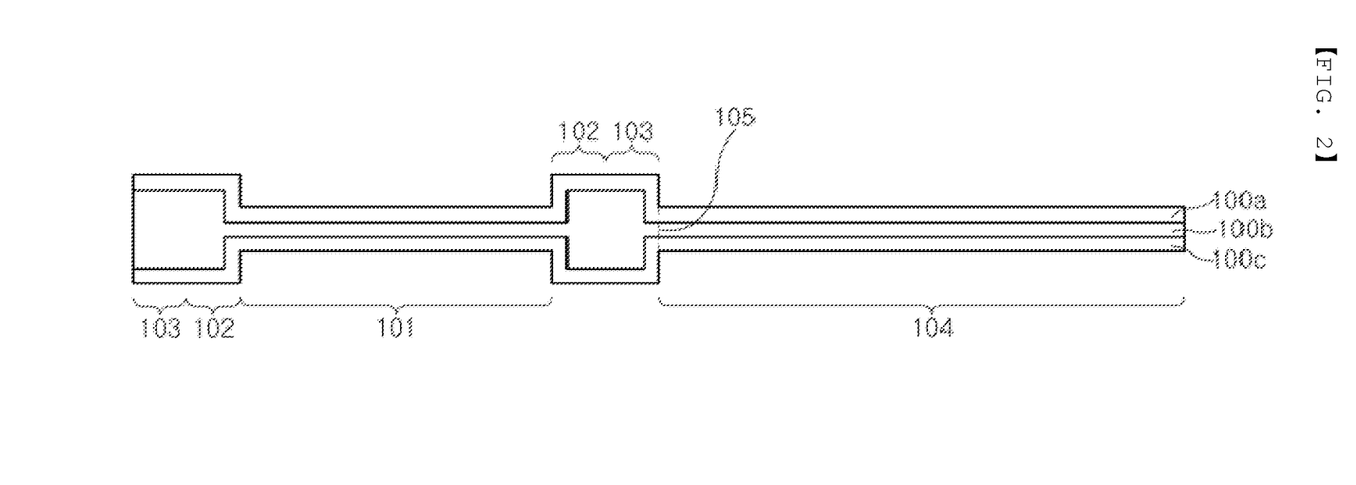
FIG. 2 is a sectional view taken along A-A of FIG. 1.

In connection therewith, FIG. 1 is a plan view of a laminate sheet according to a first embodiment, and FIG. 2 is a sectional view taken along A-A of FIG. 1.

Referring to FIGS. 1 and 2, the laminate sheet 100 is generally used in the state of being wound in the form of a roll, and a portion of the laminate sheet withdrawn in order to form an electrode assembly receiving recess is shown.

A preliminary bending line 105 is formed along the central part of the laminate sheet 100 in the winding direction of the laminate sheet, and a preliminary cover portion 104 and a preliminary recess portion 110 are located on the basis of the preliminary bending line 105. The laminate sheet, which is formed as a battery case, is bent along the preliminary bending line 105 and is then sealed, whereby a battery cell is completed. The battery case may include a lower case having a recess portion configured to receive an electrode assembly formed therein and an upper case having a cover portion coupled to the upper part of the recess portion.

The preliminary recess portion 110 includes a preliminary bottom portion 101 and a preliminary sidewall portion 102, and a preliminary sealing portion 103 is located at an outer edge extending from the preliminary sidewall portion 102.

The laminate sheet 100 includes an outer coating layer 100a, a metal layer 100b, and an inner sealant layer 100c. The thicknesses of the outer coating layer 100a, the metal layer 100b, and the inner sealant layer 100c of the preliminary bottom portion 101 are equal to the thicknesses of the outer coating layer 100a, the metal layer 100b, and the inner sealant layer 100c of the preliminary cover portion 104, respectively, and the thicknesses of the outer coating layer 100a, the metal layer 100b, and the inner sealant layer 100c of the preliminary sidewall portion 102 are equal to the thicknesses of the outer coating layer 100a, the metal layer 100b, and the inner sealant layer 100c of the preliminary sealing portion 103, respectively.

However, the thicknesses of the preliminary sidewall portion 102 and the preliminary sealing portion 103 are formed so as to be larger than the thicknesses of the preliminary bottom portion 101 and the preliminary cover portion 104. Specifically, the thicknesses of the metal layers 100b of the preliminary sidewall portion 102 and the preliminary sealing portion 103 are larger than the thicknesses of the metal layers 100b of the preliminary bottom portion 101 and the preliminary cover portion 104.

For example, the thicknesses of the metal layers 100b of the preliminary sidewall portion 102 and the preliminary sealing portion 103 may be formed so as to be 120% to 300% of the thicknesses of the metal layers 100b of the preliminary bottom portion 101 and the preliminary cover portion 104.

In the case in which the numerical range is less than 120%, the thicknesses of a sidewall portion and a sealing portion of an electrode assembly receiving portion may be smaller than the thicknesses of a bottom portion and a cover portion of the electrode assembly receiving portion after formation of the battery case, which is undesirable. In the case in which the numerical range is greater than 300%, the weight and volume of the battery case are increased, whereby energy density is reduced, which is also undesirable.

In addition, the thicknesses of the outer coating layers 100a and the inner sealant layers 100c of the preliminary sidewall portion 102 and the preliminary sealing portion 103 are formed so as to be equal to the thicknesses of the outer coating layers 100a and the inner sealant layers 100c of the preliminary bottom portion 101 and the preliminary cover portion 104.

Alternatively, unlike what is shown in FIG. 2, at least one of the outer coating layer and the metal layer of the preliminary sidewall portion may be formed so as to be thicker than a corresponding one of the outer coating layer and the metal layer of the preliminary bottom portion. The thicknesses of the outer coating layers 100a and the metal layers 100b of the preliminary sidewall portion 102 and the preliminary sealing portion 103 may be formed so as to be larger than the thicknesses of the outer coating layer 100a and the metal layer 100b of the preliminary bottom portion 101. For example, the sum of the thicknesses of the outer coating layers 100a and the metal layers 100b of the preliminary sidewall portion 102 and the preliminary sealing portion 103 may be formed so as to be 120% to 300% of the sum of thicknesses of the outer coating layer 100a and the metal layer 100b of the preliminary bottom portion 101.

In a concrete example, the laminate sheet may be configured to have a structure in which preliminary recess portions configured to receive the electrode assembly are formed at both sides on the basis of the preliminary bending line in a symmetrical fashion and in which the thickness of the preliminary sidewall portion is formed so as to be larger than the thickness of the preliminary bottom portion.

Figure 3:
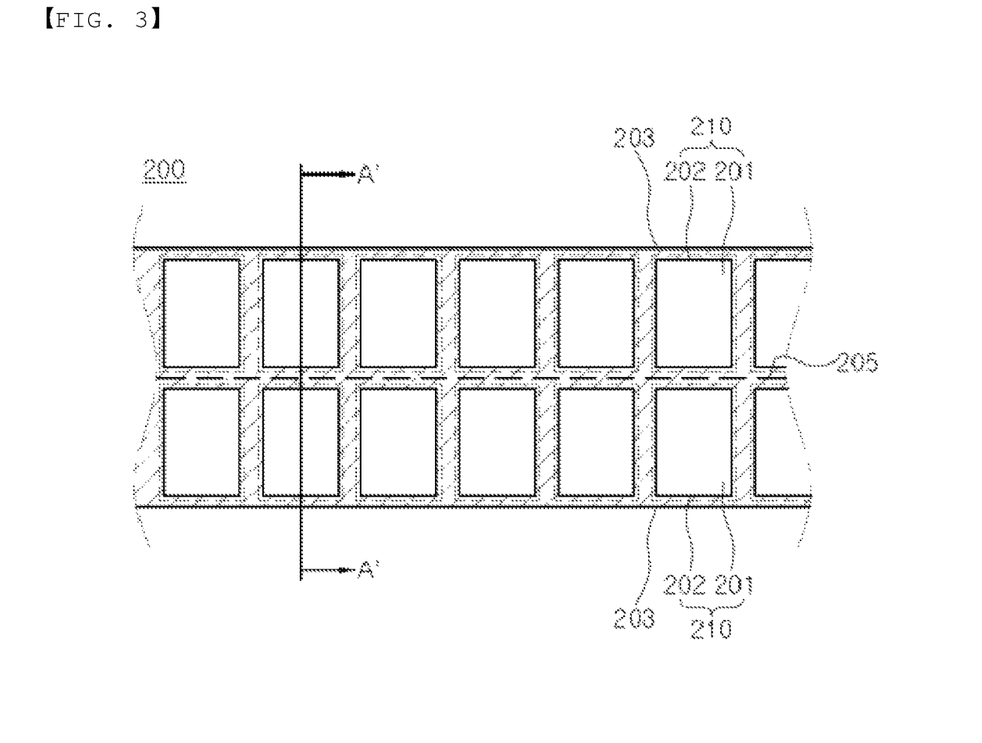
FIG. 3 is a plan view of a laminate sheet according to a second embodiment.
Figure 4:
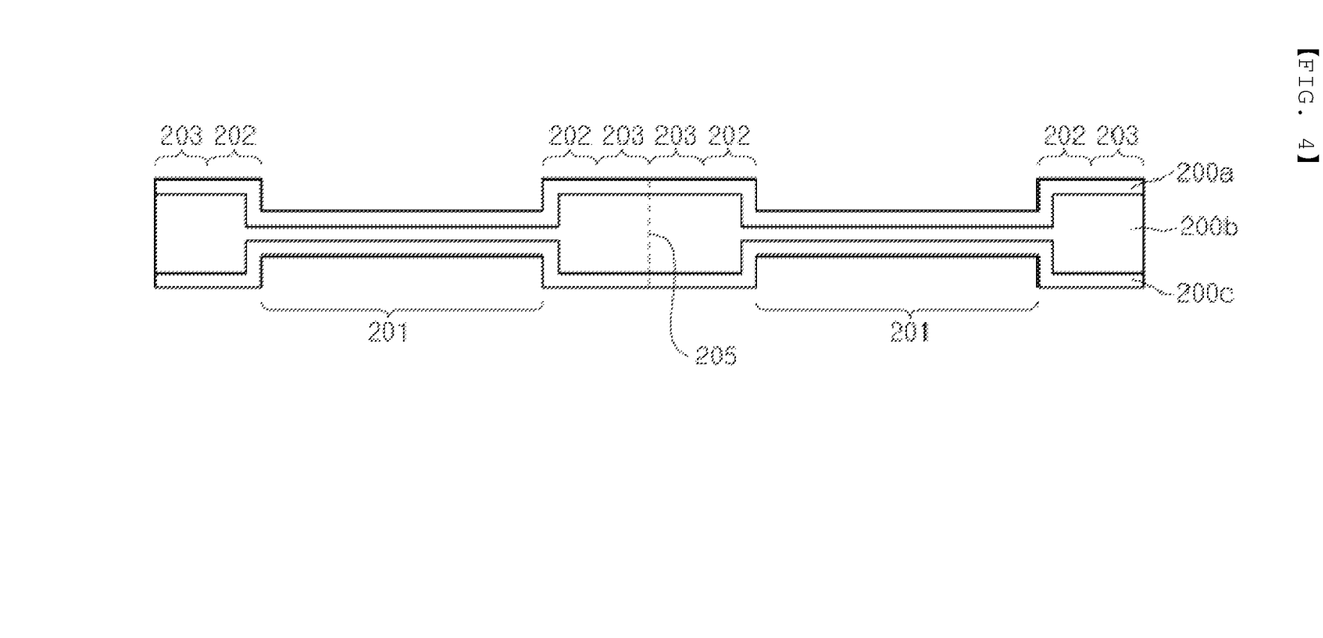
FIG. 4 is a sectional view taken along A'-A' of FIG. 3.

In connection therewith, FIG. 3 is a plan view of a laminate sheet according to a second embodiment, wherein a portion of the laminate sheet withdrawn in order to form an electrode assembly receiving recess is shown as in FIG. 1, and FIG. 4 is a sectional view taken along A'-A' of FIG. 3.

Referring to FIGS. 3 and 4, a preliminary bending line 205 is formed along the central part of the laminate sheet 200 in the winding direction of the laminate sheet 200, and preliminary recess portions 210 configured to receive an electrode assembly are located on the basis of the preliminary bending line 205. The laminate sheet, which is formed as a battery case, is bent along the preliminary bending line 205 and is then sealed, whereby a battery cell is completed. The battery case may include a lower case having a recess portion configured to receive the electrode assembly formed therein and an upper case having a cover portion coupled to the upper part of the recess portion, the upper case having a recess portion configured to receive the electrode assembly formed therein.

The preliminary recess portion 210 include a preliminary bottom portion 201 and a preliminary sidewall portion 202, and a preliminary sealing portion 203 is located at an outer edge extending from the preliminary sidewall portion 202.

The laminate sheet 200 includes an outer coating layer 200a, a metal layer 200b, and an inner sealant layer 200c. The thicknesses of the outer coating layer 200a, the metal layer 200b, and the inner sealant layer 200c of the preliminary sidewall portion 202 are equal to the thicknesses of the outer coating layer 200a, the metal layer 200b, and the inner sealant layer 200c of the preliminary sealing portion 203, respectively, and the thicknesses of the outer coating layer 200a, the metal layer 200b, and the inner sealant layer 200c of the preliminary sidewall portion 202 are equal to the thicknesses of the outer coating layer 200a, the metal layer 200b, and the inner sealant layer 200c of the preliminary sealing portion 203, respectively.

However, the thicknesses of the preliminary sidewall portion 202 and the preliminary sealing portion 203 are formed so as to be larger than the thickness of the preliminary bottom portion 201. Specifically, the thicknesses of the metal layers 200b of the preliminary sidewall portion 202 and the preliminary sealing portion 203 are larger than the thickness of the metal layer 200b of the preliminary bottom portion 201.

For example, the thicknesses of the metal layers 200b of the preliminary sidewall portion 202 and the preliminary sealing portion 203 may be formed so as to be 120% to 300% of the thickness of the metal layer 200b of the preliminary bottom portion 201.

In the case in which the numerical range is less than 120%, the thicknesses of a sidewall portion and a sealing portion of an electrode assembly receiving portion may be smaller than the thicknesses of a bottom portion of the electrode assembly receiving portion after formation of the battery case, which is undesirable. In the case in which the numerical range is greater than 300%, the weight and volume of the battery case are increased, whereby energy density is reduced, which is also undesirable.

In addition, the thicknesses of the outer coating layers 200a and the inner sealant layers 200c of the preliminary sidewall portion 202 and the preliminary sealing portion 203 are formed so as to be equal to the thicknesses of the outer coating layer 200a and the inner sealant layer 200c of the preliminary bottom portion 201.

Alternatively, unlike what is shown in FIG. 4, at least one of the outer coating layer and the metal layer of the preliminary sidewall portion may be formed so as to be thicker than a corresponding one of the outer coating layer and the metal layer of the preliminary bottom portion. The thicknesses of the outer coating layers 200a and the metal layers 200b of the preliminary sidewall portion 202 and the preliminary sealing portion 203 may be formed so as to be larger than the thicknesses of the outer coating layer 200a and the metal layer 200b of the preliminary bottom portion 201.

For example, the sum of the thicknesses of the outer coating layers 200a and the metal layers 200b of the preliminary sidewall portion 202 and the preliminary sealing portion 203 may be formed so as to be 120% to 300% of the sum of thicknesses of the outer coating layer 200a and the metal layer 200b of the preliminary bottom portion 201.

Meanwhile, as a modification of the laminate sheet 100 of FIGS. 1 and 2, the laminate sheet may be configured such that the preliminary bottom portion, the preliminary sealing portion, and the preliminary cover portion have the same thickness and such that only the preliminary sidewall portion has a relatively large thickness, and as a modification of the laminate sheet 200 of FIGS. 3 and 4, the preliminary bottom portion and the preliminary sealing portion may have the same thickness while only the preliminary sidewall portion has a relatively large thickness.

Figure 5:
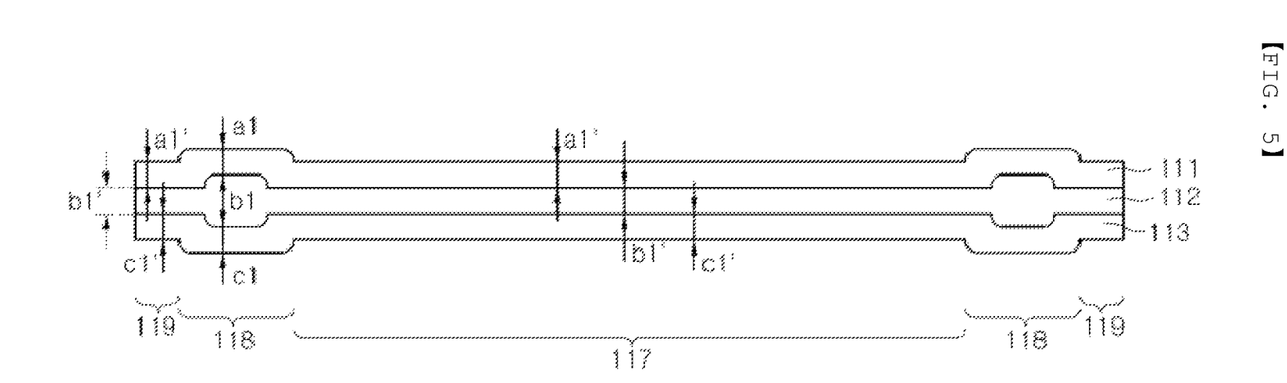
FIG. 5 is a partial sectional view showing the thickness of a laminate sheet according to a third embodiment.

In connection therewith, FIG. 5 is a partial sectional view showing the thickness of a laminate sheet according to a third embodiment.

Referring to FIG. 5, the laminate sheet includes an outer coating layer 111, a metal layer 112, and an inner sealant layer 113, and the total thickness of a preliminary bottom portion 117 is equal to total thickness of a preliminary sealing portion 119. Specifically, the thicknesses of the outer coating layer 111, the metal layer 112, and the inner sealant layer 113 of the preliminary bottom portion 117 are equal to the thicknesses of the outer coating layer 111, the metal layer 112, and the inner sealant layer 113 of the preliminary sealing portion 119, respectively.

The thickness of a preliminary sidewall portion 118 is formed so as to be larger than the thicknesses of the preliminary bottom portion 117 and the preliminary sealing portion 119, wherein the thickness b1 of the metal layer 112 of the preliminary sidewall portion 118 is formed so as to be larger than the thickness b1' of the metal layer 112 of each of the preliminary bottom portion 117 and the preliminary sealing portion 119. However, the thickness a1 of the outer coating layer 111 and the thickness c1 of the inner sealant layer 113 of the preliminary sidewall portion 118 are equal to the thickness a1' of the outer coating layer 111 and the thickness c1' of the inner sealant layer 113 of each of the preliminary bottom portion 117 and the preliminary sealing portion 119, respectively.

Meanwhile, in order to manufacture the laminate sheet having the structure shown in FIG. 5, the inner sealant layer, the metal layer, and the outer coating layer may be sequentially stacked in a plane, and may then be laminated.

Figure 6:
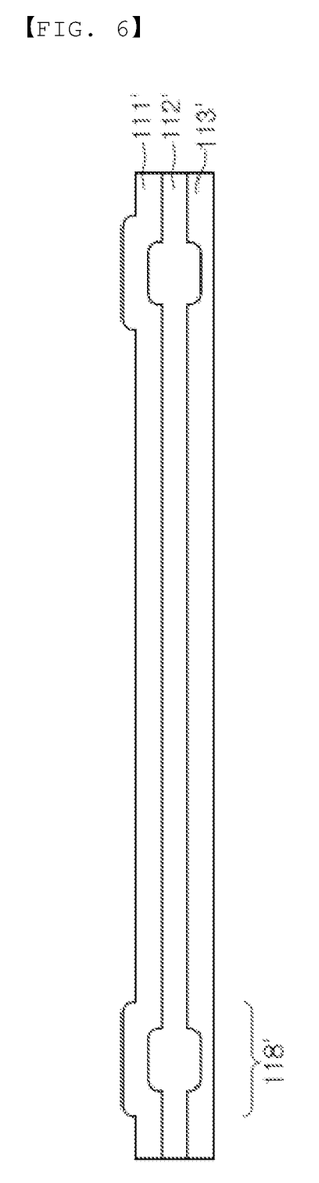
FIG. 6 is a reference view in which a process of manufacturing the laminate sheet according to the third embodiment is reflected.

In connection therewith, FIG. 6 is a reference view in which a process of manufacturing the laminate sheet according to the third embodiment is reflected. In this case, each of an outer coating layer 111' and a metal layer 112', excluding an inner sealant layer 113', has the same form as that of FIG. 5. However, the inner sealant layer 113' of a preliminary sidewall portion 118' may be formed so as to be thinner than the metal layer 112' of the preliminary sidewall portion, which has a thick form.

In the case in which the laminate sheet configured such that the metal layer of the preliminary sidewall portion is relatively thick is used, as described above, it is possible to prevent damage to the laminate sheet even in the case in which the electrode assembly receiving recess is formed deep.

In a concrete example, the thickness of the preliminary sidewall portion may have thickness deviation within a range within which the thickness of the preliminary sidewall portion is larger than the thickness of the preliminary bottom portion.

Figure 7:
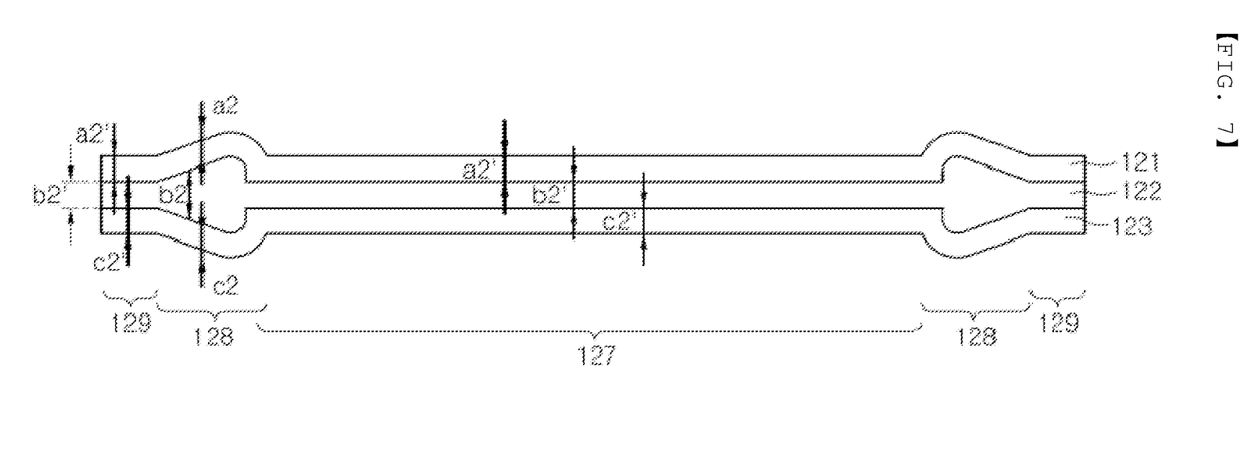
FIG. 7 is a partial sectional view showing the thickness of a laminate sheet according to a fourth embodiment.

In connection therewith, FIG. 7 is a partial sectional view showing the thickness of a laminate sheet according to a fourth embodiment.

Referring to FIG. 7, the laminate sheet includes an outer coating layer 121, a metal layer 122, and an inner sealant layer 123, and the total thickness of a preliminary bottom portion 127 is equal to total thickness of a preliminary sealing portion 129. Specifically, the thicknesses of the outer coating layer 121, the metal layer 122, and the inner sealant layer 123 of the preliminary bottom portion 127 are equal to the thicknesses of the outer coating layer 121, the metal layer 122, and the inner sealant layer 123 of the preliminary sealing portion 129, respectively.

The thickness of a preliminary sidewall portion 128 is formed so as to be larger than the thicknesses of the preliminary bottom portion 127 and the preliminary sealing portion 129, wherein the thickness b2 of the metal layer 122 of the preliminary sidewall portion 128 may have thickness deviation within a range within which the thickness b2 of the metal layer 122 of the preliminary sidewall portion 128 is larger than the thickness b2' of the metal layer 112 of each of the preliminary bottom portion 127 and the preliminary sealing portion 129.

That is, the metal layer 122 of the preliminary sidewall portion 128 may be configured to have a structure in which the thickness of the metal layer gradually increases toward the preliminary bottom portion 127.

However, the thickness a2 of the outer coating layer 121 and the thickness c2 of the inner sealant layer 123 of the preliminary sidewall portion 128 are equal to the thickness a2' of the outer coating layer 121 and the thickness c2' of the inner sealant layer 123 of each of the preliminary bottom portion 127 and the preliminary sealing portion 129, respectively.

In the case in which the laminate sheet configured to have a structure in which the thickness of the metal layer gradually increases toward the preliminary bottom portion is used, as described above, it is possible to prevent damage to the laminate sheet even in the case in which the electrode assembly receiving recess is formed deep. As a result, it is possible to obtain the effects of improving yield and increasing energy density.

Alternatively, unlike the structure of FIG. 7, the metal layer of the preliminary sidewall portion may be configured to have a structure in which the thickness of the metal layer gradually decreases toward the preliminary bottom portion, or may be configured to have a structure in which the central part of the preliminary sidewall portion is the thickest and the thickness of the preliminary sidewall portion gradually decreases toward the preliminary sealing portion and the preliminary bottom portion.

Figure 8:
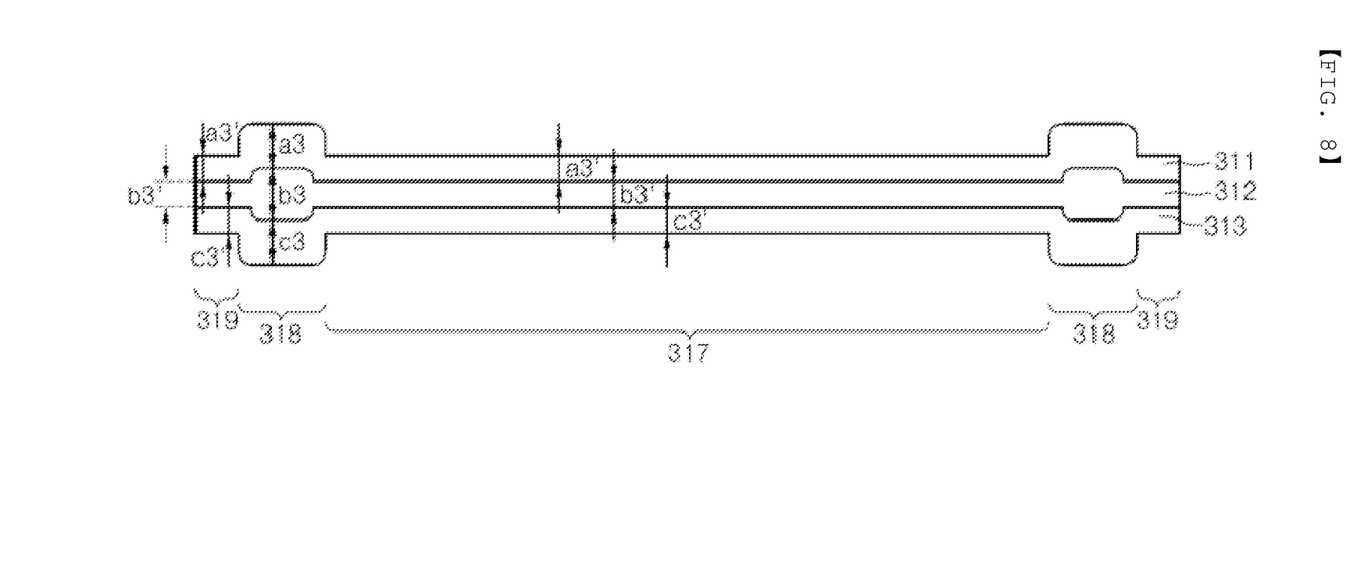
FIG. 8 is a partial sectional view showing the thickness of a laminate sheet according to a fifth embodiment.

FIG. 8 is a partial sectional view showing the thickness of a laminate sheet according to a fifth embodiment.

Referring to FIG. 8, the laminate sheet includes an outer coating layer 311, a metal layer 312, and an inner sealant layer 313, and the total thickness of a preliminary bottom portion 317 is equal to total thickness of a preliminary sealing portion 319. Specifically, the thicknesses of the outer coating layer 311, the metal layer 312, and the inner sealant layer 313 of the preliminary bottom portion 317 are equal to the thicknesses of the outer coating layer 311, the metal layer 312, and the inner sealant layer 313 of the preliminary sealing portion 319, respectively.

The thickness of a preliminary sidewall portion 318 is formed so as to be larger than the thicknesses of the preliminary bottom portion 317 and the preliminary sealing portion 319, wherein the thickness a3 of the outer coating layer 311 and the thickness b3 of the metal layer 312 of the preliminary sidewall portion 318 are formed so as to be larger than the thickness a3' of the outer coating layer 311 and the thickness b3' of the metal layer 312 of each of the preliminary bottom portion 317 and the preliminary sealing portion 319, respectively. Optionally, the thickness c3 of the inner sealant layer 313 of the preliminary sidewall portion 318 may be formed so as to be equal to or greater than the thickness c3' of the inner sealant layer 313 of the preliminary bottom portion 317 and the preliminary sealing portion 319.

In the case in which the laminate sheet configured to have a structure in which the outer coating layer and the metal layer of the preliminary sidewall portion are relatively thick is used, as described above, it is possible to prevent the occurrence of a bleaching phenomenon at the time of forming the electrode assembly receiving recess due to an increase in thickness of the outer coating layer and to form a deep electrode assembly receiving recess due to an increase in thickness of the metal layer.

Here, the outer coating layer constituting the preliminary sidewall portion may be made of a different material than the outer coating layer of each of the preliminary bottom portion and the preliminary sealing portion. Specifically, the outer coating layer constituting the preliminary sidewall portion may be made of a material that exhibits higher elongation than the outer coating layer of each of the preliminary bottom portion and the preliminary sealing portion. In this case, the present invention has an advantage in that it is possible to more securely prevent the occurrence of a bleaching phenomenon which may occur as the outer coating layer is stretched at the time of pressing to form the recess portion so as to have a large depth.

In connection therewith, for example, a fluoro-resin-based material including a fluorinated resin copolymer may be used as the outer coating layer constituting the preliminary sidewall portion, and a polyester-based or polyethylene-based material, which is generally used, may be used as the outer coating layer of each of the preliminary bottom portion and the preliminary sealing portion.

The present invention provides a pouch-shaped battery case manufactured by forming a laminate sheet for battery cases as described above. Specifically, since a laminate sheet configured such that the thickness of a preliminary sidewall portion is relatively thick is pressed to manufacture a battery case, even in the case in which the preliminary sidewall portion is stretched as the result of forming an electrode assembly receiving recess and thus the thickness of the preliminary sidewall portion is reduced, the thickness of a sidewall portion constituting the side surface of the recess may be equal to or larger than the thickness of a bottom portion of the recess, compared to a battery case manufactured using a conventional laminate sheet.

Figure 9:
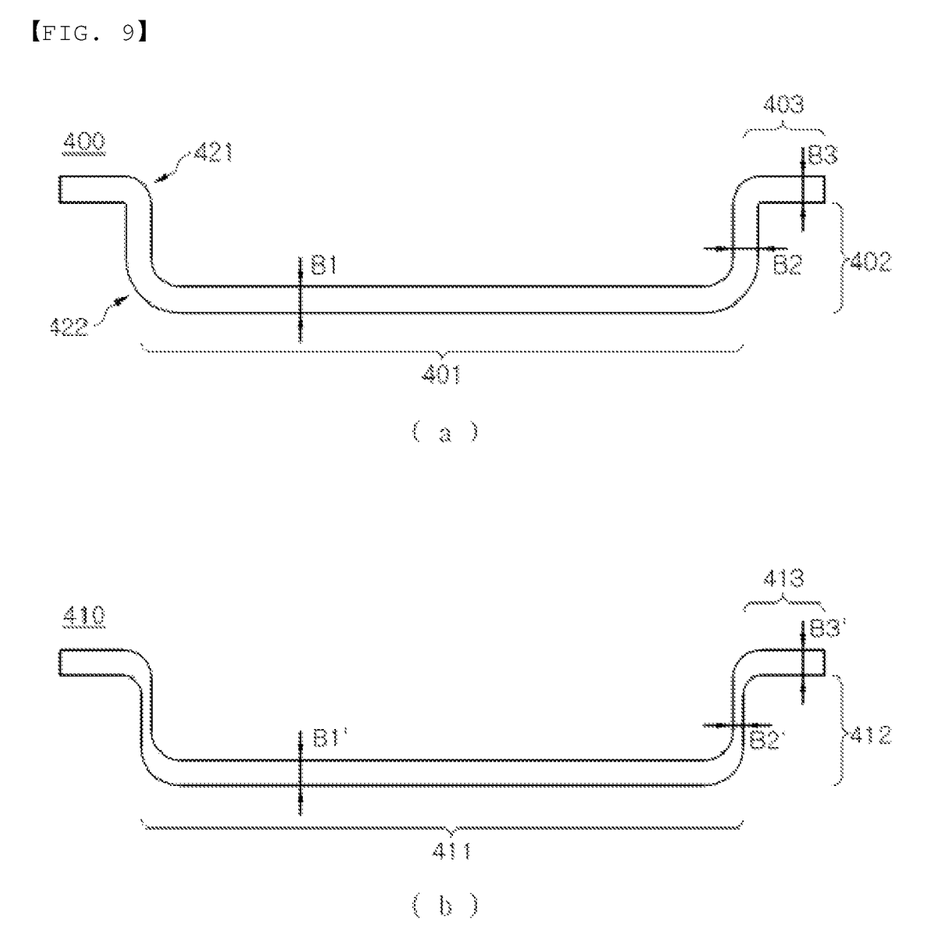
FIG. 9(a) is a sectional view of a lower case of a pouch-shaped battery manufactured using a laminate sheet according to the present invention.
FIG. 9(b) is a sectional view of a lower case of a pouch-shaped battery manufactured using a conventional laminate sheet.

In connection therewith, FIG. 9(a) is a sectional view of a lower case of a pouch-shaped battery manufactured using a laminate sheet according to the present invention, and FIG. 9(b) is a sectional view of a lower case of a pouch-shaped battery manufactured using a conventional laminate sheet.

Referring to FIG. 9(a), a pouch-shaped battery case 400 is a battery case manufactured using a laminate sheet according to the present invention, wherein a recess configured to receive an electrode assembly is formed in the pouch-shaped battery case, the recess includes a bottom portion 401 and a sidewall portion 402, and a sealing portion 403 extends outwards from the sidewall portion 402.

The pouch-shaped battery case 400 may be configured such that the thickness B1 of the bottom portion 401, the thickness B2 of the sidewall portion 402, and the thickness B3 of the sealing portion 403 are equal to each other, or may be configured such that the thickness B2 of the sidewall portion 402 is larger than the thickness B1 of the bottom portion 401 and the thickness B3 of the sealing portion 403.

In contrast, referring to FIG. 9(b), it can be seen that a pouch-shaped battery case 410 manufactured using a conventional laminate sheet, such as a laminate sheet having a uniform thickness, has a structure in which the thickness B1' of a bottom portion 411 is equal to the thickness B3' of a sealing portion 413 while the thickness B2' of a sidewall portion 412 is relatively small. The reason for this is that the sidewall portion 412 becomes thin as the result of being stretched during formation of a recess.

That is, in the pouch-shaped battery case according to the present invention, the thickness of the sidewall portion of the recess is maintained so as to be equal to or larger than the thickness of the bottom portion of the recess even in the case in which the recess configured to receive the electrode assembly is formed, whereby it is possible to prevent the occurrence of a problem in that cracks are formed due to the small thickness of the laminate sheet and it is possible to form the recess deeper than a conventional pouch-shaped secondary battery.

Meanwhile, the pouch-shaped battery case according to the present invention includes the bottom portion, the sidewall portion, and the sealing portion, wherein each of a portion of the bottom portion connected to the lower part 422 of the sidewall portion and a portion of the sealing portion connected to the upper part 421 of the sidewall portion may have a thickness equal to the thickness of the sidewall portion or may have a thickness larger than the thickness of the central part of the bottom portion and the thickness of the outer end of the sealing portion.

In addition, the present invention provides a battery pack having pouch-shaped battery cells, each of which includes the pouch-shaped battery case, stacked therein, wherein a bottom portion of one of the battery cells is disposed so as to face a cover portion or a bottom portion of another battery cell neighboring thereto in tight contact therewith.

In general, the pouch-shaped battery cells are received in the battery pack in the state of being stacked such that recess portions of neighboring battery cells face each other. For pouch-shaped battery cells manufactured using the laminate sheet of FIGS. 1 and 2, the bottom portion of one of the battery cells may be disposed so as to face the cover portion of another battery cell neighboring thereto in tight contact therewith. For pouch-shaped battery cells manufactured using the laminate sheet of FIGS. 3 and 4, the bottom portion of one of the battery cells may be disposed so as to face the bottom portion of another battery cell neighboring thereto in tight contact therewith.

A person having ordinary skill in the art to which the present invention pertains will appreciate that various applications and modifications are possible based on the above description without departing from the scope of the present invention.

DESCRIPTION OF REFERENCE SYMBOLS 100, 200: Laminate sheets
110, 120: Preliminary recess portions
101, 117, 127, 201, 317: Preliminary bottom portion
102, 118, 118', 128, 202, 318: Preliminary sidewall portions
103, 119, 129, 203, 319: Preliminary sealing portions
104: Preliminary cover portion
105, 205: Preliminary bending lines
100a, 200a, 111, 111', 121, 311: Outer coating layers
100b, 200b, 112, 112', 122, 312: Metal layers
100c, 200c, 113, 113', 123, 313: Inner sealant layers
400, 410: Pouch-shaped battery cases
401, 411: Bottom portions
402, 412: Sidewall portions
403, 413: Sealing portions
421: Upper part of sidewall portion
422: Lower part of sidewall portion
a1, a2, a1', a2', a3, a3': Thicknesses of outer coating layers
b1, b2, b1', b2', b3, b3': Thicknesses of metal layers
c1, c2, c1', c2', c3, c3': Thicknesses of inner sealant layers
B1, B1': Thicknesses of bottom portions
B2, B2': Thicknesses of sidewall portions
B3, B3': Thicknesses of sealing portions

INDUSTRIAL APPLICABILITY

As is apparent from the above description, in a laminate sheet for battery cases according to the present invention, it is possible to prevent pin holes or cracks from being generated at the time of forming an electrode assembly receiving recess.

In addition, the electrode assembly receiving recess may be formed deep, whereby it is possible to receive a thick electrode assembly, and therefore it is possible to manufacture a high-capacity battery cell.

In addition, since a laminate sheet for battery cases configured such that only a preliminary side portion of the electrode assembly receiving recess is thick is used, whereby it is possible to prevent the occurrence of a problem in that the thickness of a battery cell is increased in the case in which a battery case is manufactured using a laminate sheet that is generally thick.

The invention claimed is:

1. A laminate sheet for battery cases, comprising:
a preliminary recess portion configured to receive an electrode assembly, the preliminary recess portion comprising a preliminary bottom portion and a preliminary sidewall portion constituting a side surface of the preliminary recess portion, the preliminary sidewall portion extending completely around the preliminary bottom portion, and
a preliminary sealing portion located at an outer edge extending from the preliminary sidewall portion, wherein an entirety of the preliminary sidewall portion has a thickness that is larger than a thickest part of the preliminary bottom portion.

2. The laminate sheet for battery cases according to claim 1, wherein
the laminate sheet for battery cases comprises an outer coating layer, a metal layer, and an inner sealant layer, and
at least one of an outer coating layer or a metal layer of the preliminary sidewall portion is thicker than a corresponding one of an outer coating layer or a metal layer of the preliminary bottom portion.

3. The laminate sheet for battery cases according to claim 1, wherein a thickness of a metal layer of the preliminary sidewall portion is larger than a thickness of a metal layer of the preliminary bottom portion.

4. The laminate sheet for battery cases according to claim 1, wherein the thickness of the preliminary sidewall portion has a thickness deviation within a range within which the thickness of the preliminary sidewall portion is larger than the thickness of the preliminary bottom portion.

5. The laminate sheet for battery cases according to claim 1, wherein the laminate sheet is configured such that the preliminary recess portion and a preliminary cover portion are formed on both sides of a preliminary bending line, and wherein the preliminary cover portion is formed in a planar shape and with a thickness equal to the thickness of the preliminary bottom portion.

6. The laminate sheet for battery cases according to claim 1, wherein
the laminate sheet is configured to have a structure in which the preliminary recess portion is formed on both sides of a preliminary bending line in a symmetrical fashion.

7. The laminate sheet for battery cases according to claim 1, wherein the thickness of the preliminary sidewall portion and a thickness of the preliminary sealing portion are larger than the thickness of the preliminary bottom portion.

8. The laminate sheet for battery cases according to claim 2, wherein the outer coating layer of the preliminary sidewall portion is made of a different material than the outer coating layer of each of the preliminary bottom portion and the preliminary sealing portion.

9. The laminate sheet for battery cases according to claim 8, wherein the outer coating layer of the preliminary sidewall portion is made of a material that exhibits higher elongation than the outer coating layer of each of the preliminary bottom portion and the preliminary sealing portion.

10. A pouch-shaped battery case manufactured by forming the laminate sheet according to claim 7.

11. The pouch-shaped battery case according to claim 10, wherein a thickness of a sidewall portion constituting a side surface of a recess configured to receive an electrode assembly is equal to or larger than a thickness of a bottom portion of the recess.

12. A pouch-shaped battery cell comprising the pouch-shaped battery case according to claim 10.

13. A battery pack having pouch-shaped battery cells according to claim 12 stacked therein, wherein a bottom portion of one of the battery cells is disposed so as to face a cover portion or a bottom portion of an adjacent battery cell in tight contact therewith.

* * * * *